United States Patent
Sharma

(10) Patent No.: US 11,588,893 B1
(45) Date of Patent: Feb. 21, 2023

(54) DETERMINING WHICH EDGE NODE TO UTILIZE BASED ON RESPONSE TIME AND NETWORK BANDWIDTH

(71) Applicant: BANK OF AMERICA CORPORATION, Charlotte, NC (US)

(72) Inventor: Anirudh Kumar Sharma, Haryana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/492,991

(22) Filed: Oct. 4, 2021

(51) Int. Cl.
*H04L 67/1097* (2022.01)
*G06N 20/00* (2019.01)
*H04L 43/0852* (2022.01)
*H04L 43/028* (2022.01)

(52) U.S. Cl.
CPC ......... *H04L 67/1097* (2013.01); *G06N 20/00* (2019.01); *H04L 43/028* (2013.01); *H04L 43/0852* (2013.01)

(58) Field of Classification Search
CPC ............... H04L 67/1097; H04L 43/028; H04L 43/0852; G06N 20/00
See application file for complete search history.

(56) References Cited

U.S. PATENT DOCUMENTS

| | | | |
|---|---|---|---|
| 2010/0110909 A1* | 5/2010 | Slutsman | H04L 43/0852 370/252 |
| 2017/0257321 A1* | 9/2017 | Qureshi | H04L 43/0894 |
| 2019/0342183 A1 | 11/2019 | Nunna et al. | |
| 2020/0204655 A1* | 6/2020 | Khalid | H04L 67/306 |
| 2020/0327371 A1 | 10/2020 | Sharma et al. | |
| 2020/0351336 A1* | 11/2020 | Campbell | H04L 67/1008 |
| 2020/0351380 A1* | 11/2020 | Fedorov | H04W 4/70 |
| 2021/0144517 A1 | 5/2021 | Guim Bernat et al. | |
| 2021/0191740 A1* | 6/2021 | Richards | H04L 67/56 |
| 2022/0210124 A1* | 6/2022 | Smith | H04L 63/1416 |

* cited by examiner

*Primary Examiner* — Viet D Vu
(74) *Attorney, Agent, or Firm* — Moore & Van Allen PLLC; James C. Edwards

(57) ABSTRACT

Determining which edge nodes should be used for data feed preprocessing based on response time between the edge nodes and the sources and network bandwidth usage. Edge node determination does not rely on which edge node is closest in physical proximity to the source, but rather makes a determination that minimizes transmission time and ensures network bandwidth usage is minimized. Machine learning models associated with source and edge node are trained over time based on observed response times and/or network bandwidth utilization, subsequently the models are executed with bandwidth network set to zero and the model outputting the lowest response time is deemed to be the edge node that is used.

14 Claims, 8 Drawing Sheets

US 11,588,893 B1

DETERMINING WHICH EDGE NODE TO UTILIZE BASED ON RESPONSE TIME AND NETWORK BANDWIDTH

FIELD OF THE INVENTION

The present invention is generally directed to data transmission in a computing network and, more specifically, determining which edge node from amongst a plurality of edge should be used for preprocessing of a data feed destined for a target, such as a data lake.

BACKGROUND

Data lakes are storage repositories that store a vast amount of raw data in its native format. In this regard, the raw data may be structured data (e.g., specified rows and columns) transmitted from data warehouses or the like, unstructured data (e.g., data transmitted from Internet of Things (IoT) devices, application logs or the like) or semi-structured data (e.g., XML data or the like in which key value pairs are present). While a hierarchical data warehouse stores data in files or folders, a data lake uses a flat architecture to accommodate the storage of the various different types of data. Moreover, a data lake may utilize cloud storage, in whole or in part, or more conventional object storage, such as Hadoop-oriented object storage or the like.

In large entities/enterprises, data lakes may be used to support various different analytical use cases. However, a sizeable portion of the data destined for a data lake is data that serves no purpose and/or value in the analytical use cases. For example, data from IOT devices that shows normal device behavior is generally irrelevant to the analytical use cases. As a result, data lakes may implement preprocessing, in which received data is filtered to remove irrelevant data prior to storing the data in the data lake. However, since all of the preprocessing occurs locally at the data lake, unnecessary network bandwidth is consumed by transmitting the entirety of the data to the data lake. This problem is exasperated when the entity/enterprise is a global entity/enterprise and, thus, the data lake receives data feeds from various world-wide locations.

When preprocessing is occurs upstream of the data lake, such as at an edge node, the physical distance between the source of the data feed (i.e., application server) and the edge node is not as important as the need to minimize response time and ensure minimal network bandwidth utilization.

Therefore, a need exists to develop systems, methods, computer program products and the like that intelligently determining which edge node from amongst a plurality of edge nodes should be selected for preprocessing a data feed destined for a target, such as a data lake. The selection process should minimize response time between the data source and the edge node, while ensuring minimal network bandwidth utilization.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing logical upstream preprocessing at edge nodes of data destined to be stored in a data lake. Preprocessing includes filtering the data to remove data from a data feed that is deemed irrelevant to, or otherwise unnecessary for, analytical use cases or the like. In this regard the present invention makes intelligent decisions on whether or not data should be preprocessed locally, at the data lake locale, or should be processed upstream from the data lake, e.g., at an edge node or, in some instances, at the application server which transmits the data feed. In specific embodiments of the invention, these intelligent decisions are based on the rate of rejection of data exhibited by a data feed, as well as, in certain embodiments, the predicted growth of the rate of rejection.

Moreover, once a decision has been made to preprocess the data feed upstream of the data lake, the present invention makes intelligent decisions on which edge node to use for preprocessing purposes. The intelligent decision is not based on physical distance between the application server transmitting the data feed and the edge nodes, but rather, the decision is based on historical response times between the application server and each of the edge nodes, as well as, the network bandwidth usage of the networks transmitting the data feeds.

A system for determining which edge node to use for data feed preprocessing defines first embodiments of the invention. The system includes a plurality of application servers disposed in a distributed communication network and configured to transmit one or more data feeds to a target and a plurality of edge nodes disposed in the distributed communication network and configured to receive the one or more data feeds from the application servers and preprocess the one or more data feeds before transmitting the one or more data feeds to the target. The system additionally includes a computing platform having a memory and at least one processing device in communication with the memory. The memory stores instructions that are executable by the least one processing device and configured to determine an Internet Protocol (IP) address for each of the plurality of edge nodes and each of the plurality of application servers transmitting the one or more data feeds, and, using the IP addresses continuously ping the application servers transmitting the one or more data feeds from each of the plurality of edge nodes to determine response time and network bandwidth usage. The instructions are further configured to train, using the determined response times and network bandwidth usage, a plurality of machine-learning models, each machine-learning model associated with (i) one of the application servers transmitting the one or more data feeds and (ii) one of the plurality of edge nodes. Once trained, the instructions are further configured to execute the plurality of machine-learning models by changing the network bandwidth to zero and determining which of the machine-learning models outputs a lowest response time. The one of the edge nodes associated with the machine-learning model with the lowest response time defines the edge node to preprocess the data feed transmitted from the corresponding application server.

In specific embodiments of the system, the instructions are further configured to analyze the data feeds transmitted from the plurality of application servers to determine whether each data feed requires preprocessing at (i) the target, or (ii) upstream of the target, and, in response to determining that preprocessing of one or more of the data feeds requires preprocessing upstream of the target, generate preprocessing logic for the one or more of the data feeds and transmit the preprocessing logic to the corresponding determined one of the plurality of edge nodes. In such embodiments of the system, the plurality of edge nodes are further configured to receive the preprocessing logic and execute the preprocessing logic on data feeds received from one or more of the application servers using dynamic preprocessing rules prior to transmitting the preprocessed data feeds to the data lake. In related embodiments of the system, the instructions configured to analyze the data feeds to determine whether each data feed requires preprocessing at (i) the target, or (ii) upstream of the target are further configured to determine a rate of reject for each data feed transmitted from one of the plurality application servers, compare the rate of reject to a predetermined reject rate threshold, and determine that the data feed requires preprocessing (ii) upstream of the target based on the rate of reject exceeding the predetermined reject rate threshold. In such embodiments of the system, the instructions configured to determine the rate of reject are further configured to determine the rate of rejection by implementing a machine learning model that correlates a volume of records in a data feed to a volume of rejected records in the data feed. In further related embodiments of the system, the instructions are further configured to, in response to determining that rate of reject does not exceed the predetermined reject rate threshold, implement one or more machine learning models to predict a growth, over a predetermined time period, of the rate of reject, and determine whether each data feed requires preprocessing at (i) the target, or (ii) upstream of the target based on the growth of the rate or reject over the predetermined period of time.

In other specific embodiments of the system, preprocessing of the data feeds includes filtering the data feed to remove data that is deemed to be irrelevant to an analytical use case performed at the target.

In further specific embodiments of the system, the instructions are further configured to notify the application servers transmitting the one or more data feeds that subsequent data feeds are to be transmitted to the determined one of the plurality of edge nodes.

A computer-implemented method for determining which edge node to use for data feed preprocessing defines second embodiments of the invention. The method is executable by one or more processing devices. The method includes determining an Internet Protocol (IP) address for each of a plurality of edge nodes and each of a plurality of the application servers transmitting one or more data feeds, and, based on the IP addresses, continuously pinging the application servers transmitting the one or more data feeds from each of the plurality of edge nodes to determine response time and network bandwidth usage. The method further includes training, using the determined response times and network bandwidth usage, a plurality of machine-learning models, each machine-learning model associated with (i) one of the application servers transmitting the one or more data feeds and (ii) one of the plurality of edge nodes. The method additionally includes executing the plurality of machine-learning models by changing the network bandwidth to zero and determining which of the machine-learning models outputs a lowest response time. The one of the edge nodes associated with the machine-learning model with the lowest response time defines the edge node to preprocess the data feed transmitted from the corresponding application server.

In specific embodiments the method further includes analyzing the data feeds transmitted from the plurality of application servers to determine whether each data feed requires preprocessing at (i) the target, or (ii) upstream of the target. In response to determining that preprocessing of one or more of the data feeds requires preprocessing upstream of the target, generating preprocessing logic for the one or more of the data feeds and transmitting the preprocessing logic to the corresponding determined one of the plurality of edge nodes. In related embodiments the method further includes receiving, at the one of the plurality of edge nodes, the preprocessing logic; and executing the preprocessing logic on data feeds received from one or more of the application servers using dynamic preprocessing rules prior to transmitting the preprocessed data feeds to the target. In further related embodiments of the method, analyzing the data feeds to determine whether each data feed requires preprocessing at (i) the target, or (ii) upstream of the target further includes determining a rate of reject for each data feed transmitted from one of the plurality application servers, comparing the rate of reject to a predetermined reject rate threshold; and determining that the data feed requires preprocessing (ii) upstream of the target based on the rate of reject exceeding the predetermined reject rate threshold.

In other related embodiments of the method, preprocessing of the data feeds includes filtering the data feed to remove data that is deemed to be irrelevant to an analytical use case performed at the target.

In still further specific embodiments, the method includes notifying the application servers transmitting the one or more data feeds that subsequent data feeds are to be transmitted to the determined one of the plurality of edge nodes.

A computer program product including a non-transitory computer-readable medium. The non-transitory computer-readable medium includes a first set of codes for causing a computer to determine an Internet Protocol (IP) address for each of a plurality of edge nodes and each of a plurality of the application servers transmitting one or more data feeds. Additionally, the non-transitory computer-readable medium includes a second set of codes for causing a computer to continuously ping the application servers transmitting the one or more data feeds from each of the plurality of edge nodes to determine response time and network bandwidth usage. Further, the non-transitory computer-readable medium includes a third set of codes for causing a computer to train a plurality of machine-learning models, each machine-learning model associated with (i) one of the application servers transmitting the one or more data feeds, and (ii) one of the plurality of edge nodes, wherein the machine learning models are trained using the determined response times and network bandwidth usage. Moreover, the computer-readable medium includes a fourth set of codes for causing a computer to execute the plurality of machine-learning models by changing the network bandwidth to zero and determining which of the machine-learning models outputs a lowest response time. The one of the edge nodes associated with the machine-learning model with the lowest response time defines the edge node to preprocess the data feed transmitted from the corresponding application server.

In further embodiments of the computer program product, the computer-readable medium further includes a fifth set of codes for causing a computer to analyze the data feeds transmitted from the plurality of application servers to determine whether each data feed requires preprocessing at (i) the target, or (ii) upstream of the target, and a sixth set of codes for causing a computer to, in response to determining that preprocessing of one or more of the data feeds requires preprocessing upstream of the target, generate preprocessing logic for the one or more of the data feeds and transmit the preprocessing logic to the corresponding determined one of the plurality of edge nodes. In related embodiments of the computer program product, the computer-readable medium further includes a seventh set of codes for causing a computer to receive, at the one of the plurality of edge nodes, the preprocessing logic, and execute the preprocessing logic on data feeds received from one or more of the application servers using dynamic preprocessing rules prior to transmitting the preprocessed data feeds to the target. In other related embodiments of the computer program product, the fifth set of codes are further configured to analyzing the data feeds to determine whether each data feed requires preprocessing at (i) the target, or (ii) upstream of the target by determining a rate of reject for each data feed transmitted from one of the plurality application servers, comparing the rate of reject to a predetermined reject rate threshold; and determining that the data feed requires preprocessing (ii) upstream of the target based on the rate of reject exceeding the predetermined reject rate threshold or determining that the data feed requires preprocessing at (i) the target based on the rate of reject falling below the predetermined reject rate.

In further specific embodiments of the computer program product, the preprocessing of the data feeds includes filtering the data feed to remove data that is deemed to be irrelevant to an analytical use case performed at the target.

In other specific embodiments of the computer program product, the computer-readable medium further includes a fifth set of codes for causing a computer to notify the application servers transmitting the one or more data feeds that subsequent data feeds are to be transmitted to the determined one of the plurality of edge nodes.

Thus, according to embodiments of the invention, which will be discussed in greater detail below, the present invention addresses needs and/or achieves other advantages by determining which edge nodes should be used for data feed preprocessing based on response time between the edge nodes and the sources and network bandwidth usage. As such, the present invention does not merely rely on which edge node is closest in physical proximity to the source, but rather makes a determination that minimizes transmission time and ensures network bandwidth usage is minimized.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
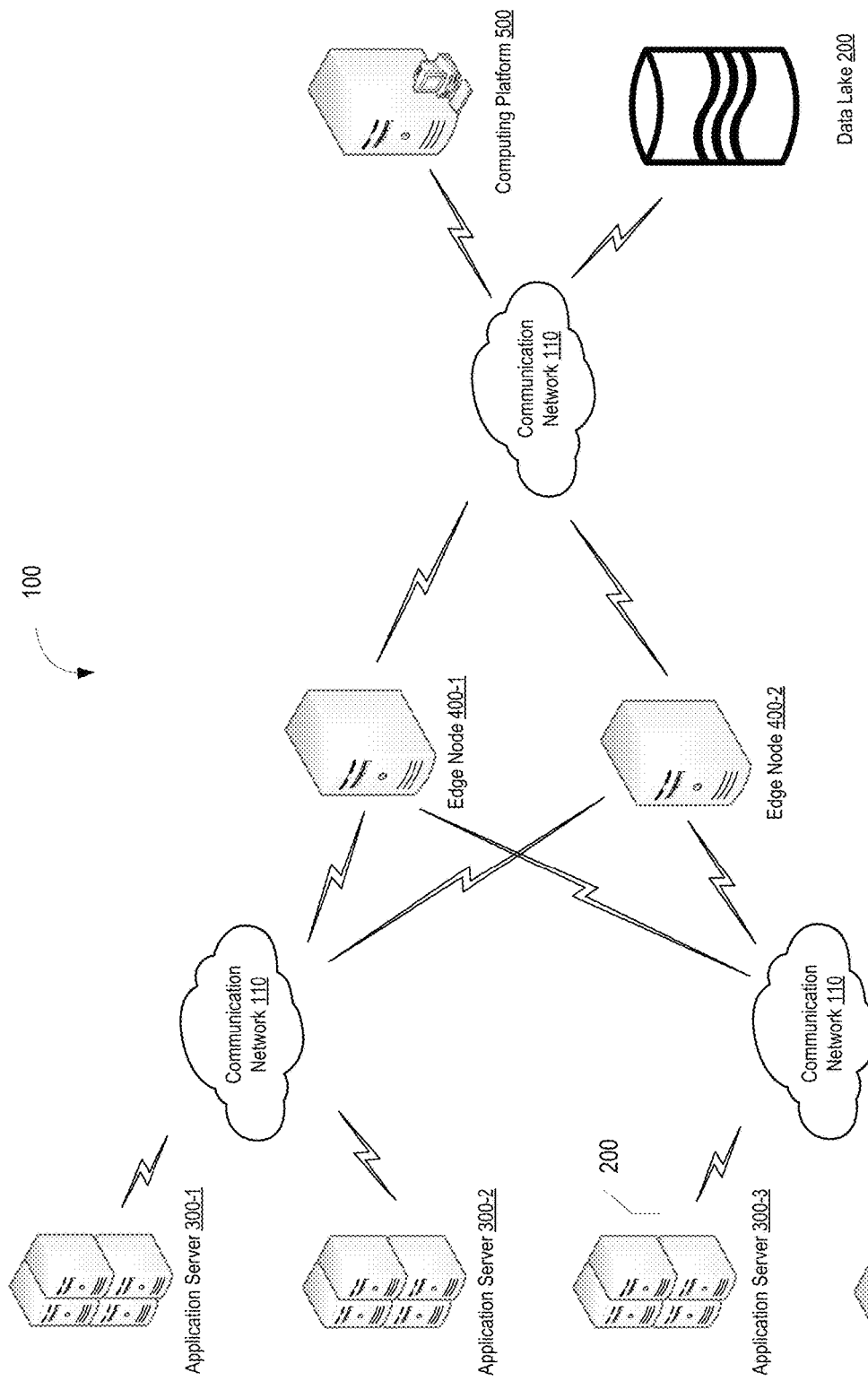
Figure 2:
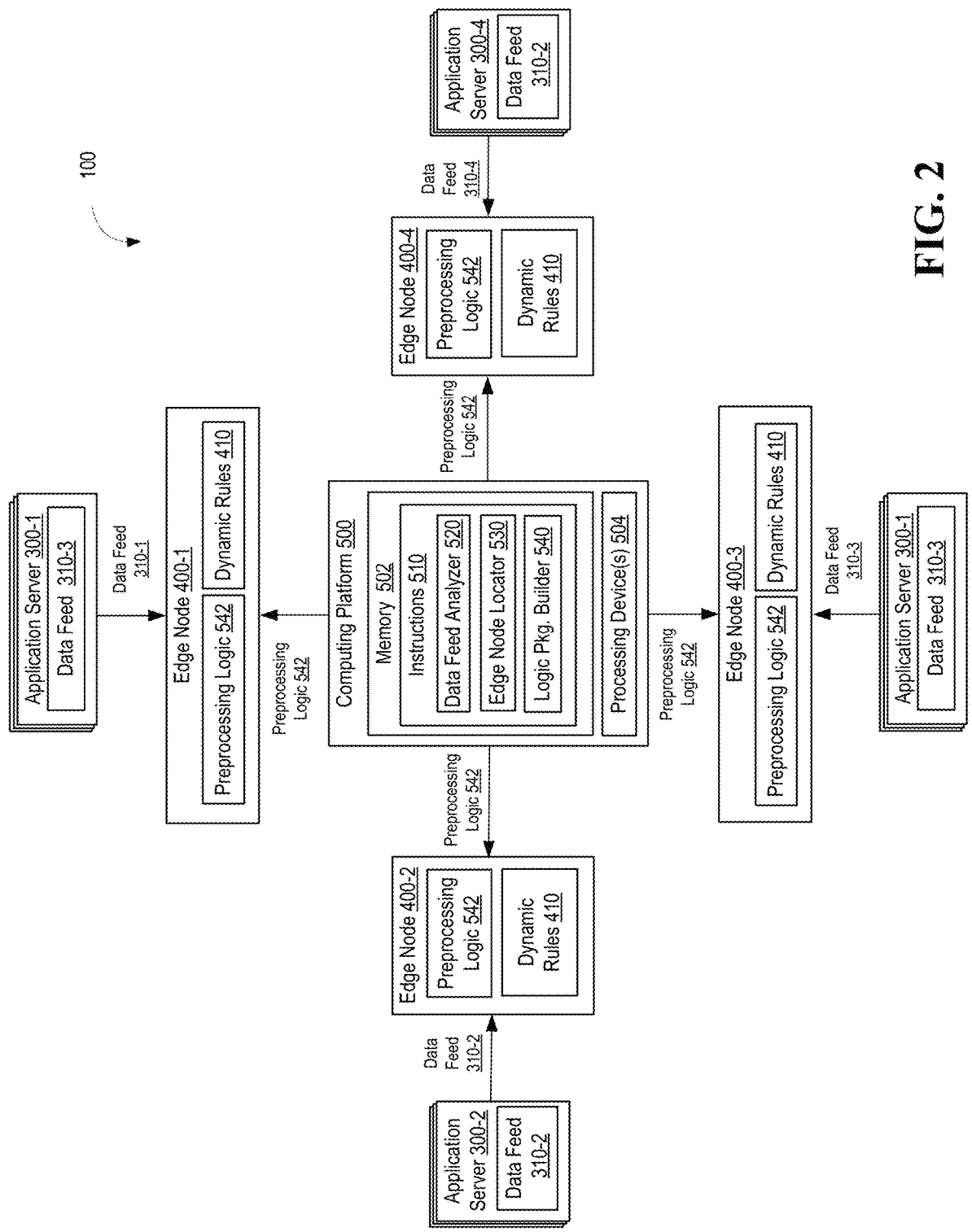
Figure 3:
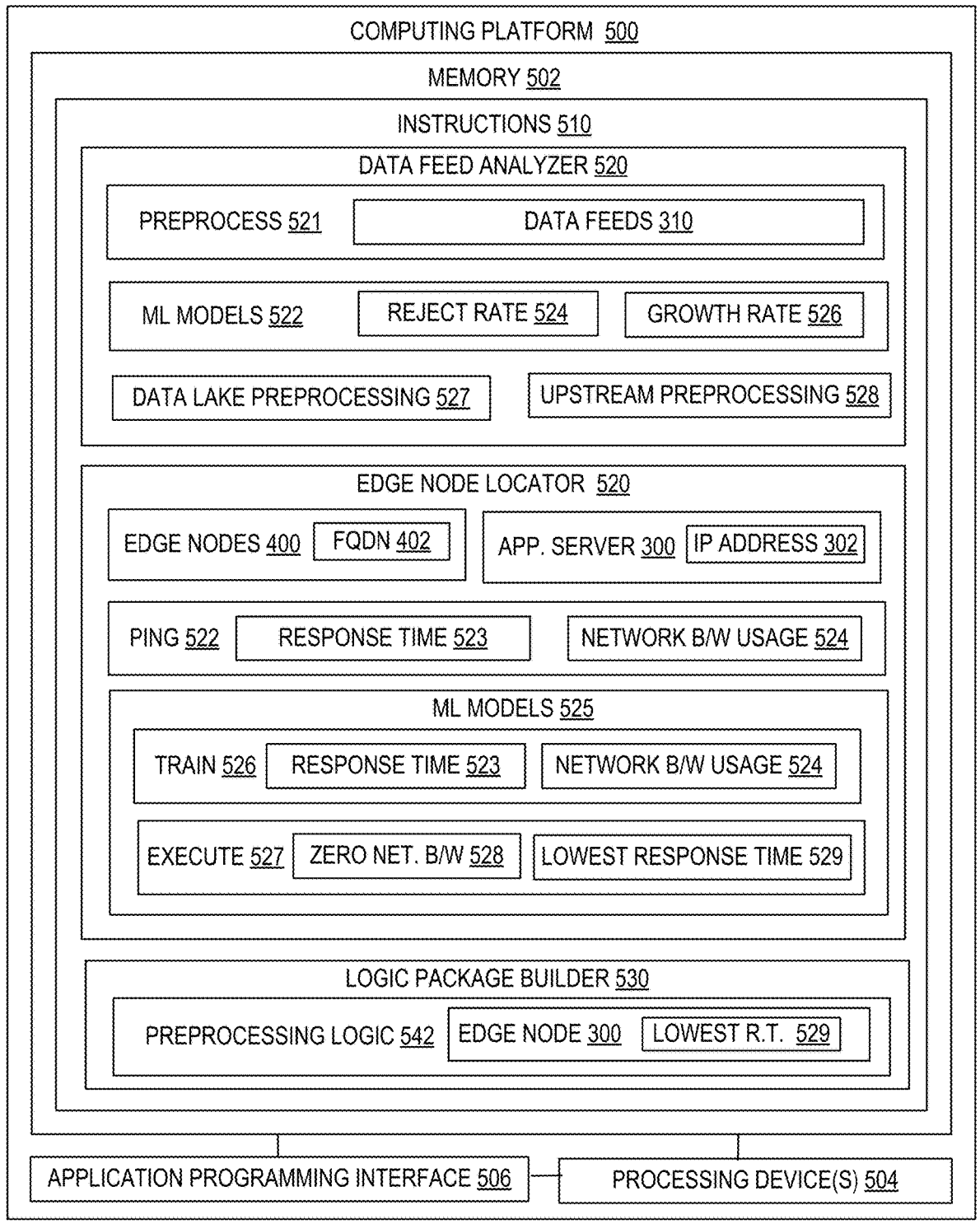
Figure 4:
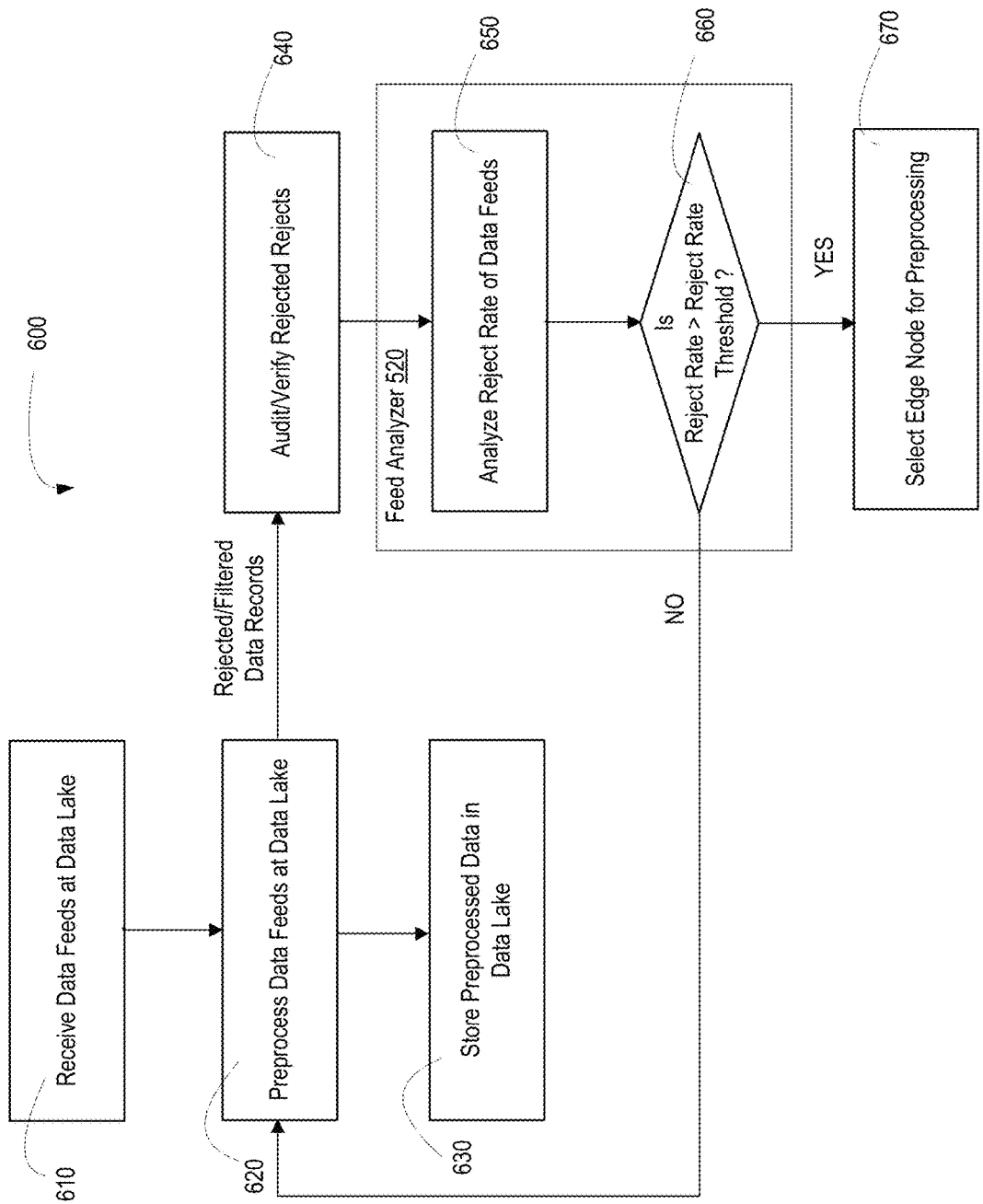
Figure 5:
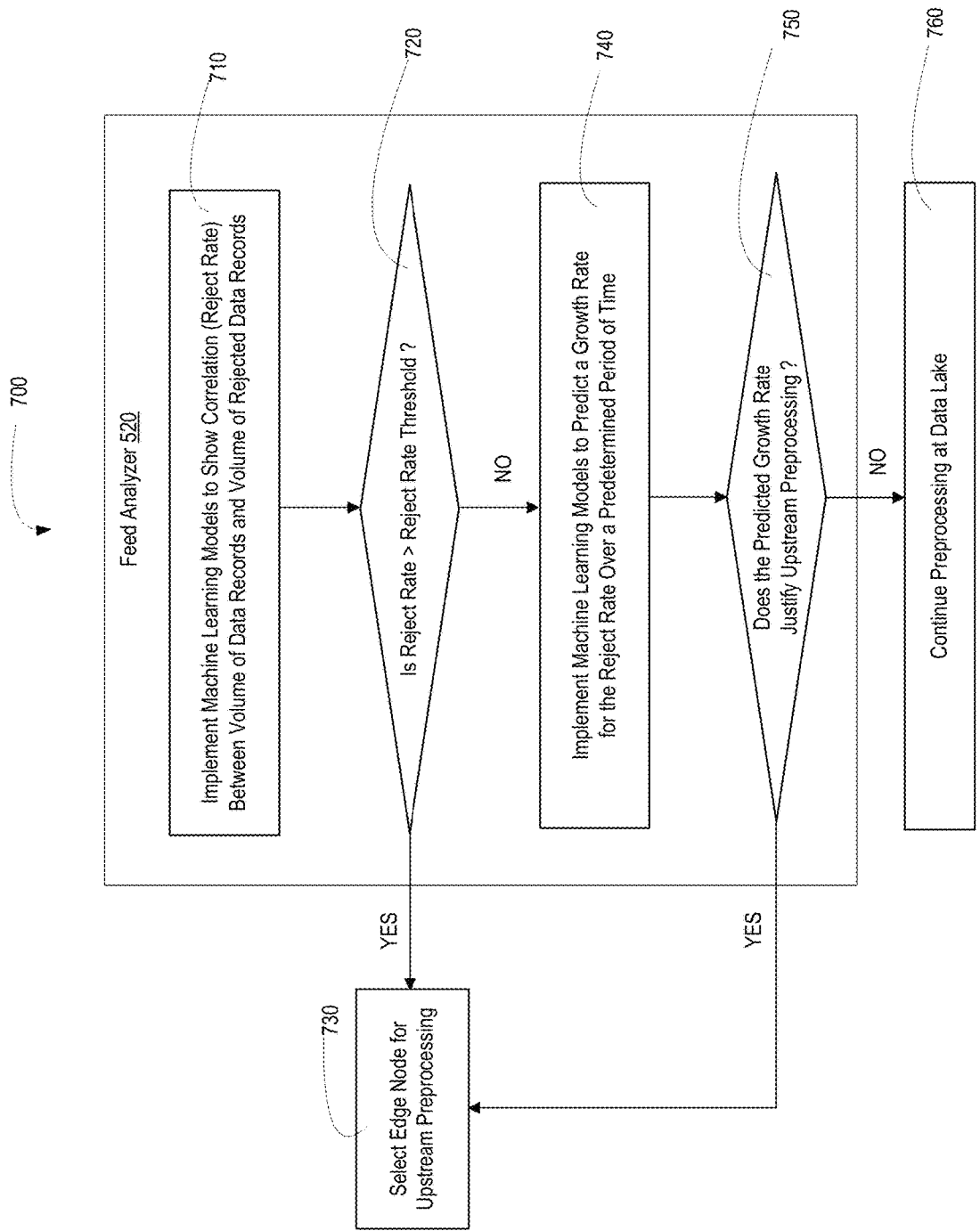
Figure 6:
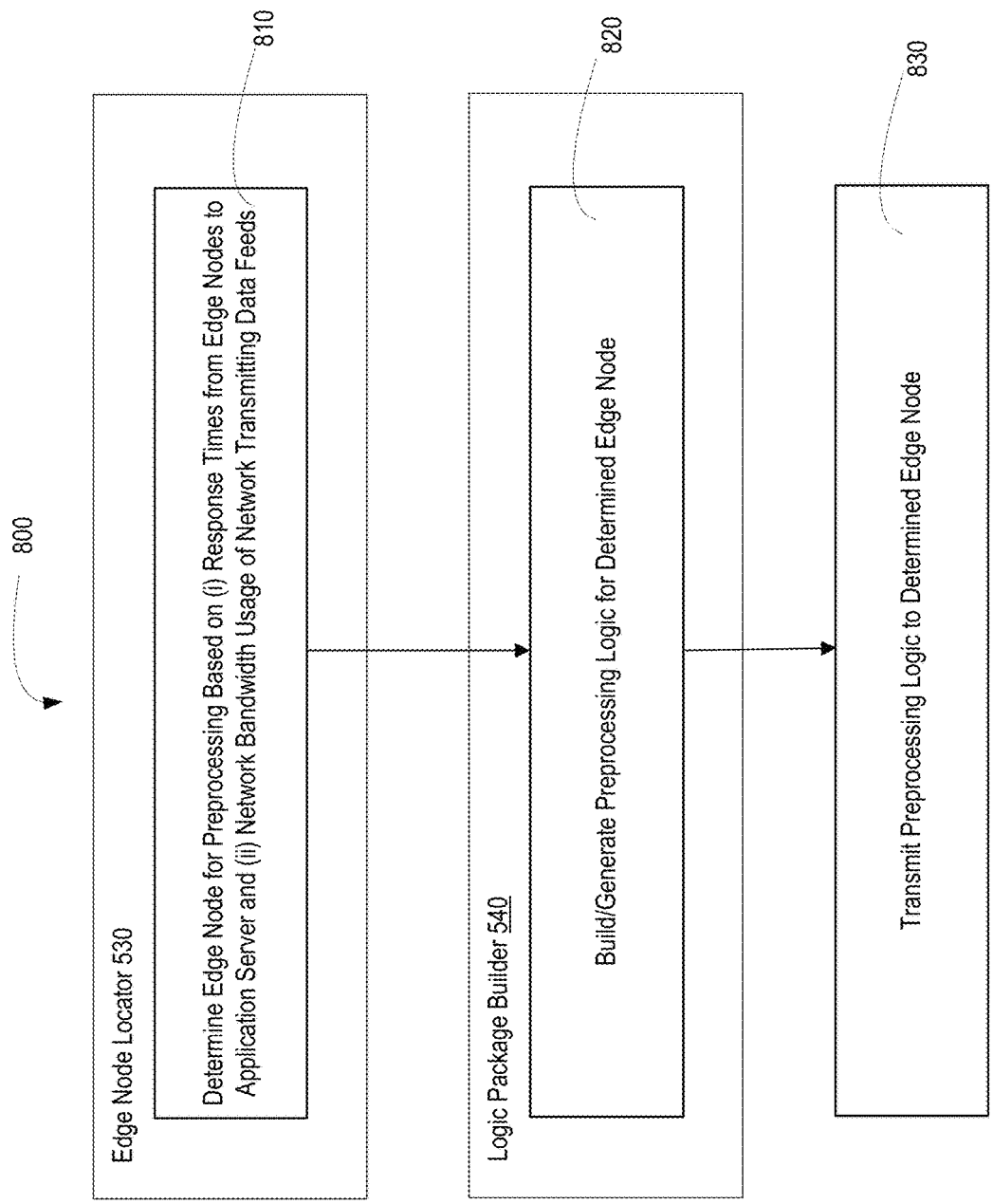
Figure 7:
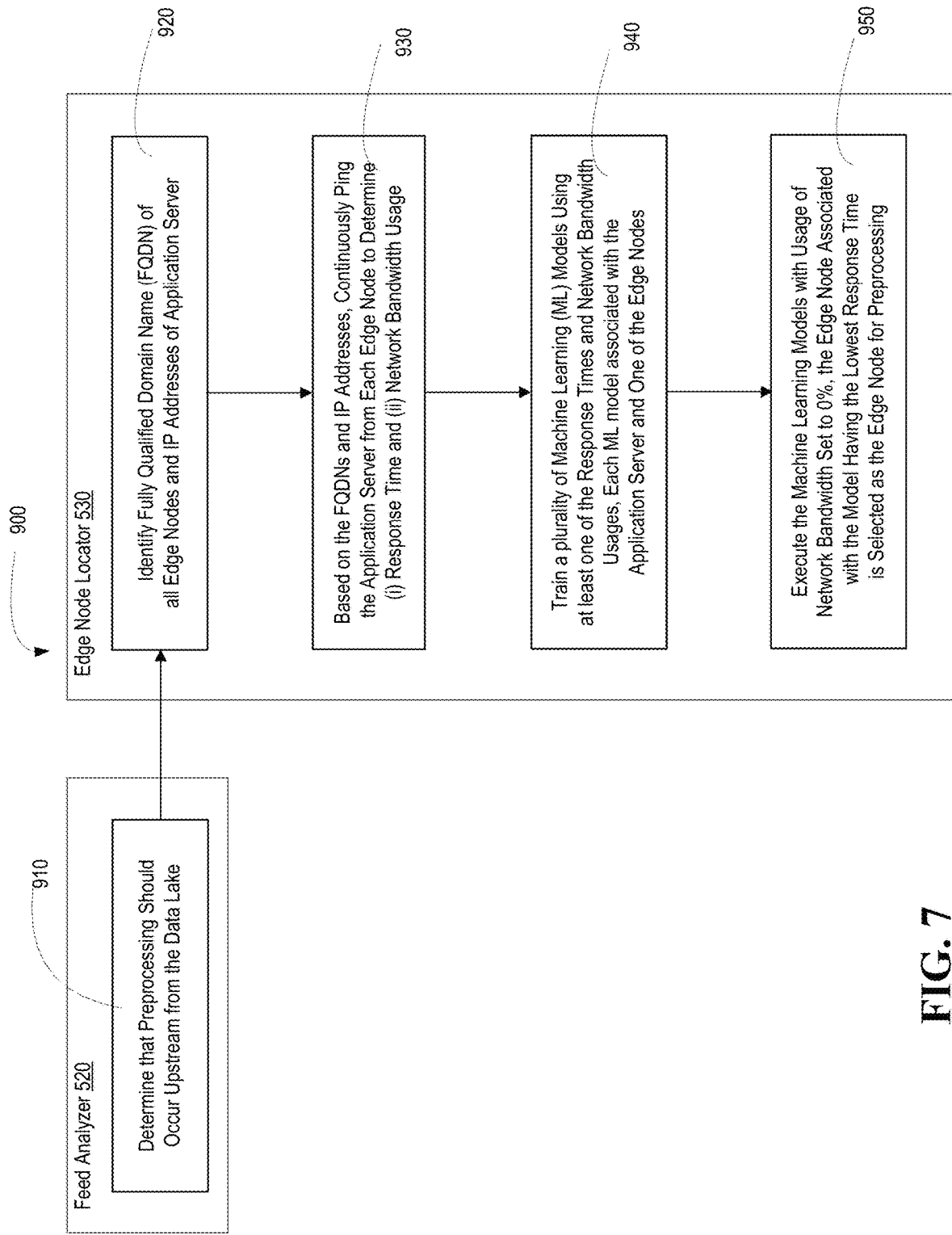
Figure 8:
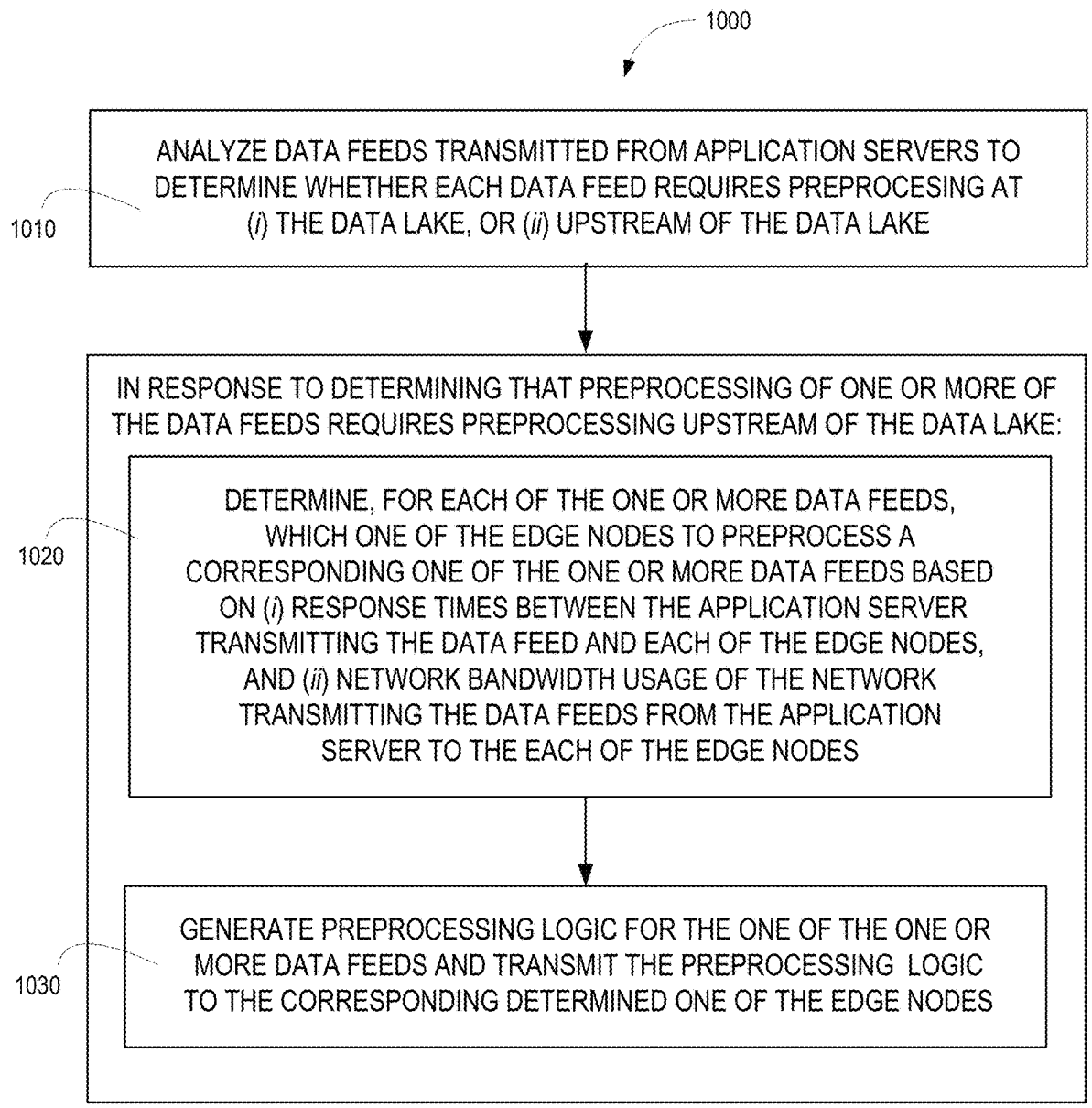

Having thus described embodiments of the disclosure in general terms, reference will now be made to the accompanying drawings, wherein:

FIG. 1 is a schematic of a system for managing the preprocessing of data, destined for storage in a data lake, upstream at edges nodes, in accordance with embodiments of the present invention;

FIG. 2 is a block diagram of a system for managing the preprocessing of data, destined for storage in a data lake, upstream at edges nodes, in accordance with embodiments of the present invention;

FIG. 3 is a block diagram of a computing platform configured for intelligently determining whether data feeds require upstream preprocessing and, if so, determining which edge node to implement for the preprocessing, in accordance with alternate embodiments of the present invention;

FIG. 4 is a flow diagram of a method for analyzing data feeds to determine whether preprocessing should occur at the data lake or upstream of the data lake, in accordance with embodiments of the present invention;

FIG. 5 is a flow diagram of a specific method for analyzing data feeds to determine, based on reject rates and the predicted growth rate of reject rates, whether preprocessing should occur at the data lake or upstream of the data lake, in accordance with alternate embodiments of the present invention;

FIG. 6 is a flow diagram of a method for determining which edge node to use for preprocessing and generating and transmitting preprocessing logic to the determined edge node; in accordance with embodiments of the present invention;

FIG. 7 is flow diagram of a specific method determining which edge node to implement for the preprocessing based on response times and network bandwidth usage, in accordance with embodiments of the present invention; and FIG. 8 is a flow diagram of a method for managing the preprocessing of data, destined for storage in a data lake, upstream at edges nodes, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as JAVA, PERL, SMALLTALK, C++, PYTHON, or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

"Computing platform" or "computing device" as used herein refers to a networked computing device within the computing system. The computing platform may include a processor, a non-transitory storage medium (i.e., memory), a communications device, and a display. The computing platform may be configured to support user logins and inputs from any combination of similar or disparate devices. Accordingly, the computing platform includes servers, personal desktop computer, laptop computers, mobile computing devices and the like.

Thus, systems, apparatus, and methods are described in detail below that provide for logical upstream preprocessing at edge nodes of data destined to be stored in a data lake. Preprocessing includes filtering the data feed to remove data that is deemed unnecessary or irrelevant or the like. In this regard the present invention makes intelligent decisions on whether or not data should be preprocessed locally, at the data lake locale, or should be processed upstream from the data lake, e.g., at an edge node or, in some instances, at the application server which transmits the data feed. In specific embodiments of the invention, these intelligent decisions are based on the rate of rejection of data exhibited by a specific data feed, as well as, in certain embodiments, the predicted growth of the rate of rejection.

Moreover, once a decision has been made to preprocess the data feed upstream of the data lake, the present invention makes intelligent decisions on which edge node to use for preprocessing purposes. The intelligent decision is not based on physical distance between the application server transmitting the data feed and the edge nodes, but rather, the decision is based on historical response times between the application server and each of the edge nodes, as well as, the network bandwidth usage of the networks transmitting the data feeds.

Referring to FIG. 1, a schematic diagram is presented of an exemplary system 100 for managing the preprocessing of data, destined for storage in a data lake, upstream at edges nodes, in accordance with embodiments of the present invention. The system 100 is implemented across a distributed communication network 110, which may include the Intranet, one or more intranets, one or more cellular networks or the like. As depicted, the system 100 includes a data lake 200 that is configured to receive data feeds, transmitted from applications servers 300-2, 300-2, 300-3 and 300-4 and store the data associated with the data feeds for purposes of supporting different types of analytical use cases. As previously discussed, a data lake is configured to store raw data and, thus the data feeds may comprise structured data, unstructured data and/or semi-structured data.

System 100 additionally includes a plurality of application servers 300-1, 300-2, 300-3 and 300-4 that are configured to transmit the data feeds to the data lake 200. Those of ordinary skill in the art will appreciate that while four applications servers are shown in FIG. 1, the system 100 of the present invention may comprise less and typically more than four application servers 300. In a large global enterprise, it should be readily apparent that the application servers 300 may be physically located throughout the world.

Additionally, system 100 includes a plurality of edge nodes 400-1 and 400-2 that are in network communication with the data lake 200 and the application servers 300-1, 300-2, 300-3 and 300-4. Those of ordinary skill in the art will appreciate that two edge nodes are shown in FIG. 1, the system 100 of the present invention may comprise less and typically more than two edge nodes 400. Each edge node is physically located proximate at least one of the application servers. For example, in a large global enterprise, each edge node may be located in the same continent, country or region as one or more of the application servers 300.

Moreover, system 100 includes a computing platform 500 that is configured to execute instructions that are configured to analyze the data feeds transmitted from the application servers 300-1, 300-2, 300-3 and 300-4 to determine whether each data feed is to be preprocessed at (i) the data lake, or (ii) upstream of the data lake (i.e., at one of the edge nodes 400-1, 400-2 or, in some embodiments of the system, at the application server 300 which is transmitting the data feed). As will be discussed in greater length infra., according to specific embodiments of the system, the determination as to whether a data feed is be processed at (i) the data lake, or (ii)

upstream of the data lake is based on data rejection rates of data feeds and, in some embodiments the predicted growth rate of the data rejection rates.

In response to determining that a data feed is to be preprocessed upstream of the data lake 200, the instructions are configured to determine which one of the edge nodes 400-1 and 400-2 to perform the preprocessing at. Such a determination is based on (i) response times between the application server 300-1, 300-2, 300-3 or 300-4 transmitting the data feed and each of the edge nodes 400-1 and 400-2 and (ii) network bandwidth usage of the networks connecting the application server 300-1, 300-2, 300-3 or 300-4 transmitting the data feed to each of the edge nodes 400-1 and 400-2. In response to determining the edge node 400-1 or 400-2, the instructions are configured to generate preprocessing logic for the data feed and transmit the preprocessing logic to the determined edge node 400-1 or 400-2.

In response to receiving the preprocessing logic, the determined edge node 400-1 or 400-2 is configured to execute the preprocessing logic on data feeds received from the application server 300-1, 300-2, 300-3 or 300-4 using dynamic preprocessing rules prior to transmitting the preprocessed data feeds to the data lake 200.

Referring to FIG. 2, a block diagram is presented of a system 100 for managing the preprocessing of data, destined for storage in a data lake, upstream at edges nodes, in accordance with embodiments of the present invention. For purposes of simplicity, the system 100 shown in FIG. 2 omits the data lake 200 shown and described in relation to FIG. 1. As discussed in relation to FIG. 1, system 100 includes a plurality of application servers 300-1, 300-2, 300-3, and 300-4, a plurality of edge nodes 400-1, 400-2, 400-3 and 400-4 and a computing platform 500.

Computing platform, which may, in some embodiments of the system, be incorporated as part of the data lake 200 (shown in FIG. 1) architecture, includes a memory 502 and one or more processing devices 504 in communication with the memory 502. Memory 502 stores instructions 510 that are executable by the one or more processing devices 504 and configured to manage upstream preprocessing of data feeds 310-1, 310-2, 330-3, 330-4 at edge nodes 400-1, 400-2, 400-3 and 400-4 prior to transmission to the downstream data lake 200 (shown in FIG. 1). As previously discussed, according to specific embodiments of the system, preprocessing includes filtering out (i.e., dropping, deleting or the like) unnecessary/irrelevant data records from the data feed.

Specifically, instructions 510 include data feed analyzer 520 that is configured to analyze the data feeds 310-1, 310-2, 310-3, 310-4 transmitted from the application servers 300-1, 300-2, 300-3 and 300-4 to determine whether each data feed is to be preprocessed at (i) the data lake 200 (shown in FIG. 1), or (ii) upstream of the data lake (i.e., at one of the edge nodes 400-1, 400-2, 400-3, or 400-4, or in some embodiments of the system, at the application server 300-1, 300-2, 300-3 or 300-4 which is transmitting the data feed 310-1, 310-2, 310-3 and 310-4).

Further, instructions 510 includes edge node locator 530 which, In response to determining that a data feed 310-3, 310-2, 310-3, or 310-4 is to be preprocessed upstream of the data lake 200 (shown in FIG. 1) is configured to determine which one of the edge nodes 400-1, 400-2, 400-3 or 400-4 to perform the preprocessing at. Such a determination is not based on the physical distance between the application server 300-1, 300-2, 300-3 and 300-4 and the edge node 400-1, 400-2, 400-3 and 400-4, but rather, is based on (i) response times between the application server 300-1, 300-2, 300-3 or 300-4 transmitting the data feed 310-1, 310-2, 310-3 and 310-4 and each of the edge nodes 400-1, 400-2, 400-3, 400-4 and (ii) network bandwidth usage of the networks connecting the application server 300-1, 300-2, 300-3 or 300-4 transmitting the data feed to each of the edge nodes 400-1, 400-2, 400-3 and 400-4. As such, while an application server 300 and one of the edge nodes 400 may be physically located in Country X, edge node locator 530 may result in a determination of using an edge node 400 physically located in Country Y, since the response time and/or network bandwidth usage is less between the application server 300 physically located in Country X and the edge node physically located in County Y.

Moreover, instructions 510 include logic package builder 540 which, in response to determining/identifying the edge node 400-1, 400-2, 400-3 or 400-4 at which preprocessing will occur, is configured to generate preprocessing logic 542 and transmit the preprocessing logic to the determined/identified edge node 400-1, 400-2, 400-3 or 400-4. It should be noted that preprocessing logic 542 is built/generated specific to a data feed 310-1, 310-2, 310-3, or 310-4 for which it will be used to preprocess. Moreover, logic builder 540 or some other portion of instructions 510 will notify application server 300-1, 300-2, 300-3 and/or 300-4 of the need to transmit the data feed 310-1, 310-2, 310-3 and/or 310-4 to the edge node 400-1, 400-2, 400-3 and/or 400-4 (as opposed to transmitting the data feed 310-1, 310-2, 310-3 and/or 310-4 directly to the data lake 200 (shown in FIG. 1)).

In response to receiving the preprocessing logic 542, the determined edge node 400-1, 400-2, 400-3, or 400-4 is configured to execute the preprocessing logic 542 on data feeds 310-1, 310-2, 310-3, 310-4 received from the application server 300-1, 300-2, 300-3 or 300-4 using dynamic preprocessing rules 410 prior to transmitting the preprocessed data feeds to the data lake 200 (FIG. 1). The dynamic preprocessing rules 410 may be stored at or accessible to the edge node 400-1, 400-2, 400-3 and 400-4 and retrieved at the time of preprocessing. The dynamic nature of preprocessing rules 410 means that the rules can change at any point in time to reflect the requirements of analytics performed on the data in the data lake 200 (shown in FIG. 1). For example, data from a specific data feed previously filtered may now, temporarily, or permanently, be deemed to be relevant to one or more analytical use cases, in which case the rules may be changed to reflect such. In this regard, a preprocessing rule may be permanently changed, such that all subsequent data feeds are affected, or rules may be changed temporarily, such as on a one-time only basis or for a predetermined time period or for a predetermined number of data feeds.

Referring to FIG. 3, a block diagram is depicted of computing platform 500, in accordance with embodiments of the present invention. In addition to providing greater detail, FIG. 3 highlights various alternate embodiments of the invention. Computing platform 500 comprises one or more computing devices/apparatus, such as servers or the like configured to execute software programs, including instructions, engines, algorithms, modules, routines, applications, tools, and the like. Computing platform 500 includes memory 502, which may comprise volatile and non-volatile memory, EPROM, EEPROM, flash cards, or any memory common to computer platforms. Moreover, memory 502 may comprise cloud storage, such as provided by a cloud storage service and/or a cloud connection service.

Further, computing platform 500 also includes processing device(s) 504, which may be an application-specific integrated circuit ("ASIC"), or other chipset, logic circuit, or other data processing device. Processing device 504 may execute an application programming interface ("API") 506 that interfaces with any resident programs, such as instructions 510 and algorithms, sub-engines/routines associated therewith or the like stored in the memory 502 of the computing platform 500.

Processing device(s) 504 may include various processing subsystems (not shown in FIG. 3) embodied in hardware, firmware, software, and combinations thereof, that enable the functionality of computing platform 500 and the operability of computing platform 500 on a distributed communication network 110 (shown in FIG. 1). For example, processing subsystems allow for initiating and maintaining communications and exchanging data with other networked devices. For the disclosed aspects, processing subsystems of processing device 504 may include any subsystem used in conjunction with instructions 510 and related engines, routines, algorithms, sub-algorithms, modules, sub-modules thereof.

Computing platform 500 additionally includes a communications module (not shown in FIG. 3) embodied in hardware, firmware, software, and combinations thereof, that enables electronic communications between computing platform 500 and other networks and/or networked devices, such as, data lake 200, application servers 300 and edge nodes 400 and the like. Thus, the communication module may include the requisite hardware, firmware, software and/or combinations thereof for establishing and maintaining a network communication connection with one or more systems, platforms, networks, or the like.

As previously discussed in relation to FIG. 2, memory 502 stores instructions 510 that are executable by the processing device(s) 504 and configured to manage preprocessing of data feeds at edge nodes for data subsequently stored within a data lake, in accordance with embodiments of the present invention. The instructions include a data feed analyzer 520 that is configured to determine whether a data feed 310 is to be preprocessed 521 at the data lake 200 (shown in FIG. 1) or upstream of the data lake at an edge node 400 or, in some embodiments of the invention, at the application server 300 which transmitted the data feed 310. In specific embodiments of the invention, machine learning models 522 are used to (i) correlate data records to data record rejects to determine a reject rate 524 for a data feed 310 and, (ii) determine patterns in data feed reject rates 524 to determine a growth rate 526 of the rejection rate 524. In such embodiments of the invention, the determination as to whether a data feed 310 is to be data lake preprocessing 527 or upstream preprocessing 528 is based on at least one of the reject rate 524 or the growth rate 526.

Instructions 510 further include edge node locator 520 that is configured to, in response to determining that a data 310 feed is to be processed upstream of the data lake, determine which of the plurality of edge nodes 400 is to be used for preprocessing the data feed 310. In specific embodiments of the invention, the determination as to which edge node is to be used includes accessing an edge node list to identify the FQDN 402 (Fully Qualified Domain Name) of all the edge nodes 400 and pulling the IP (Internet Protocol) Address 302 of the application server 300 transmitting the data feed 300. Based on the FQDN 402 and the IP address 302 each of the edge nodes 400 continuously ping 522 (over a prescribed time period, such as a day, a week or the like) the application server 300 to determine response time 523 and network bandwidth usage 524. Subsequently, machine learning models 525 are trained 526 using the results of the pinging 522 (i.e., at least one of the response times 523 or the network bandwidth usage 524. Once the machine learning models 525 have been properly trained 526, the machine learning models are executed 527 with the network bandwidth usage set to 0% 528 and the edge node 400 associated with the machine learning model outputting the lowest response time 529 is selected as the edge node 400 at which the preprocessing 521 is to occur.

Instructions 510 additionally include a logic package builder 530 that is configured to assemble a package of preprocessing logic 542 for the edge node 400 determined to have lowest response time 529 and transmit the preprocessing logic 542 to the edge node 400. In addition the logic package builder 530 or some other portion of instructions 510 are configured to notify the application server 3000 that subsequent data feeds 310 are to be routed through the edge node 400 as opposed to be transmitted directly to the data lake 200. In response to receiving the preprocessing logic 542, the edge node 400 will execute the preprocessing logic in conjunction with dynamic rules 410 (shown in FIG. 2) on all ensuing data feeds 310 transmitted from the application server 300.

Referring to FIG. 4, a flow diagram is depicted of a method 600 for initial receipt of data feeds at a data lake and the subsequent determination of whether the data feed is to be preprocessed at the data lake or upstream of the data lake. At Event 610, data feeds transmitted from an application server are received at a data lake. These data feeds may be the initial data feeds transmitted by an application server (i.e., data feeds received as part of the onboarding process) or the data feeds may be part of an already existing data feed stored within the data lake. At Event 620, the data feeds are preprocessed at the data lake. As previously discussed, according to specific embodiments of the invention, preprocessing includes filtering or otherwise rejecting data records in the data feed that are deemed to be unnecessary and/or irrelevant to subsequent analytical use cases. At Event 630, the resulting preprocessed data is stored in the data lake.

At Event 640, the rejected/filtered data records are audited/verified to ensure that they are intended to be rejected/filtered out. Subsequently, the feed analyzer 520, described in relation to FIGS. 2 and 3 determines whether the data feeds is to continue to be preprocessed at the data lake or is better suited for preprocessing upstream of the data lake. Thus, according to method 600, at Event 650, the reject rates of the data feeds are analyzed and, at Event 660, a determination is made as to whether the overall reject rate of the data feeds is greater than a predetermined reject rate threshold. If the determination is made that the overall reject rate is not greater than the predetermined reject rate, at Event 620, subsequent data feeds are preprocessed at the date lake. If the determination is made that the overall reject rate is greater than the predetermined reject rate threshold, at Event 670, at edge node is selected for preprocessing the data feed. In alternate embodiments of the invention, if the determination is made that the overall reject rate is greater than the predetermined reject rate threshold, a determination is made as the capability of the application server itself preprocessing the data feed. If the application server is determined to be capable and agreeable to preprocessing the data feed, preprocessing of the data feed at an edge node is unnecessary and, thus the determination of which node to use is obviated.

Referring to FIG. 5, a flow diagram is depicted of a method 700 for data feed analyzation, specifically, determining whether a data feed is to be preprocessed at the data lake or upstream from the data lake. In specific embodiments of the invention, the data feed analyzer 520, at Event 710, implements machine learning models to show the correlation (i.e., reject rate) between the volume of data records analyzed and volume of rejected records data records in the data records analyzed. At Decision 720, a determination is made as to whether the reject rate is greater than a predetermined reject rate threshold. Data feeds with minimal amount of rejects can be preprocessed at the data lake without having much of an adverse effect on network bandwidth; however, data feeds with a high volume of rejects can be processed upstream of the data lake resulting in less network bandwidth usage. If a specific data feed is determined to have a reject rate greater than the predetermined reject rate threshold, at Event 730, the edge node locator 530 (shown in FIGS. 2 and 3) selects an edge node for upstream preprocessing. In alternate embodiments of the invention, in which the application server transmitting the data feed has the capability to perform preprocessing, it may be possible to task the application server with preprocessing responsibilities, thus, eliminating the need to select an edge node for preprocessing.

If the specific data feed is determined to have a reject rate less than the predetermined reject rate threshold, at Event 740, machine learning models are implemented to predict a growth rate for the reject rate over a predetermined time period (year-to-year or the like). At Decision 750 a determination is made as to whether the growth rate for the reject rate justifies upstream preprocessing (e.g., whether the growth rate is trending toward the reject rate exceeding the predetermined reject rate threshold or the like). If the growth rate of the reject rate justifies upstream preprocessing, at Event 730, the edge node locator 530 (shown in FIGS. 2 and 3) selects an edge node for upstream preprocessing. If the growth rate of the reject rate does not justify upstream processing, at Event 760, preprocessing at the data lake continues.

Referring to FIG. 6, a high-level flow diagram is depicted of a method 800 for determining which edge node to implement for preprocessing and, once determined, building preprocessing logic for the determined edge node, in accordance with embodiments of the present invention. Once a determination has been that preprocessing for a data feed is to occur upstream of the data lake, at Event 810, edge node locator 540 determines which edge node from amongst a plurality of edge nodes to be used for the preprocessing operation. As previously discussed the edge node is determined, not based on physical distance between the edge node and the application transmitting the data feed, but rather, the edge is determined based on (i) the response times between the edge nodes and the application server and, (ii) the network bandwidth usage of the network transmitting the data feed from the application server to the edge node. Once the edge node has been determined/selected, at Event 820, preprocessing logic is generated/built for the determined edge node and, at Event 830, the preprocessing logic is transmitted to the determined edge node. The Edge node will execute the preprocessing logic by applying dynamic preprocessing/filter rules thereto to result in a filtered data feed, which has removed/filtered out data records contained therein which are deemed to be unnecessary and/or irrelevant to subsequent analytical use cases performed on the data stored in the data lake.

Referring to FIG. 7, a flow diagram is depicted of a method 900 for determining which edge node is to be used for pre-processing a data feed destined for a data lake, in accordance with embodiments of the present invention. At Event 910, feed analyzer 520 determines that a data feed is to be preprocesses upstream from the data lake (i.e., at an edge node prior to transmission to the data lake). As part of edge node locator 530 (described in relation to FIGS. 3 and 4), at Event 920, a listing of the edge list is accessed to identify the Fully Qualified Domain Name (FQDN) of the edge nodes and an IP address is pulled from the application server. At Event 930, based on the FQDN and IP address, the application server is continuously (over a predetermined time period, such as a day, a week or the like) pinged from each of the edge nodes and the resulting response time and network bandwidth usage are recorded.

At Event 940, a plurality of Machine Learning (ML) models are trained with one or more of the recorded network bandwidth usage and the response times. Each of the plurality of ML models are associated with one of the edge nodes and the application server. Once the ML models have been properly trained, at Event 950, the ML models are executed with network bandwidth usage being constant (i.e., set to 0%) and the edge node associated with the ML model that outputs the lowest response time is deemed to be the edge node at which preprocessing is to occur. In this regard, the edge node determination process takes into account both the response time to the application server and the network bandwidth utilization.

Referring to FIG. 8, a flow diagram is depicted of a method 1000 for managing the preprocessing of data feeds, destined for a data lake, at edge nodes, in accordance with embodiments of the present invention. At Event 1010, data feeds transmitted for application servers are analyzed to determine whether each data feed requires preprocessing at (i) the data lake, or (ii) upstream of the data lake, such as at an edge node, or in some instances, at the application server transmitting the data feed. In specific embodiments of the invention, such a determination is made by comparing the reject rate from one or more specific data feeds to a reject rate threshold and, in further embodiments, determining if rate of growth of the reject rate justifies preprocessing upstream of the data lake.

In response to determining that preprocessing of one or more of the data feeds requires preprocessing upstream of the data lake, at Event 1020, a determination is made as to which one from amongst a plurality of edge nodes is to be used for preprocessing the data feed. As previous discussed, the determination is not based on physical distance between the edge nodes and the application server, but rather is based on (i) response times between the edge nodes and application server transmitting the data feed and (ii) network bandwidth usage experienced while measuring the response time. Once the edge node has been determined, at Event 1030, preprocessing logic is generated/build for the data feed and transmitted to the determined edge node. Further, the application server is notified that subsequent data feeds are to be routed through the determined edge node as opposed to be transmitted directly to the data lake. The edge node, in receipt of the preprocessing logic, executes the preprocessing logic on subsequent data feeds by applying dynamic preprocess rules to result in a filtered data feed in which unnecessary and/or irrelevant data records are dropped/removed from the data feed.

Thus, as described in detail above, present embodiments of the invention include systems, methods, computer program products and/or the like for managing preprocessing of data at edge nodes that is destined for storage in a data lake. Specifically, the invention provides for intelligently determining whether a data feed is to be preprocessed at (i) the data lake, or (ii) upstream of the data lake (i.e., at an edge node or, in some embodiments at the application server transmitting the data feed). Additionally, once upstream preprocessing has been determined, the invention provides for intelligently determine which edge node is to be chosen for preprocessing based, not on physical distance between the application server and the edge node, but rather, response times between the application server and the edge nodes and network bandwidth usage encountered by the network transmitting the data feed. As such, by performing a portion of the preprocessing, including data filtering, within a distributed computing environment in which preprocessing occurs upstream of the data lake, such as intelligently selected edge nodes, the present invention limits the transmission of unnecessary data and, thus, limits unnecessary network bandwidth usage.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for determining which edge node to use for data feed preprocessing, the system comprising:
   a plurality of application servers disposed in a distributed communication network and configured to transmit one or more data feeds to a target;
   a plurality of edge nodes disposed in the distributed communication network and configured to receive the one or more data feeds from the application servers and preprocess the one or more data feeds before transmitting the one or more data feeds to the target;
   a computing platform comprising a memory and at least one processing device in communication with the memory, wherein the memory stores instructions, executable by the least one processing device and configured to:
      analyze the data feeds prior to transmission from the plurality of application servers to determine whether each data feed requires preprocessing at (i) the target, or (ii) upstream of the target by determining a rate of reject for each data feed transmitted from one of the plurality application servers, comparing the rate of reject to a predetermined reject rate threshold, and determining that the data feed requires preprocessing (ii) upstream of the target based on the rate of reject exceeding the predetermined reject rate threshold,
      determine an Internet Protocol (IP) address for each of the plurality of edge nodes and each of the plurality of the application servers transmitting the one or more data feeds,
      continuously ping the application servers transmitting the one or more data feeds from each of the plurality of edge nodes to determine response times for each of applications server and edge node pair from amongst the applications servers and the plurality of edge nodes,
      train a plurality of machine-learning models, each machine-learning model associated with (i) one of the application servers transmitting the one or more data feeds and (ii) one of the plurality of edge nodes, wherein the machine learning models are trained using at least the determined response times and network bandwidth usage of the networks used for communication between the application servers transmitting the one or more data feeds and the plurality of edge nodes,
      execute the plurality of machine-learning models to determine which of the machine-learning models outputs a lowest response time, wherein the one of the edge nodes associated with the machine-learning model with the lowest response time defines the edge node to preprocess the data feed transmitted from the corresponding application server, and
      generate preprocessing logic for the one or more of the data feeds and transmit the preprocessing logic to the corresponding determined one of the plurality of edge nodes.

2. The system of claim 1, wherein the plurality of edge nodes are further configured to receive the preprocessing logic and execute the preprocessing logic on data feeds received from one or more of the application servers using dynamic preprocessing rules prior to transmitting the preprocessed data feeds to the data lake.

3. The system of claim 1, wherein preprocessing of the data feeds comprises filtering the data feed to remove data that is deemed to be irrelevant to an analytical use case performed at the target.

4. The system of claim 1, wherein the instructions are further configured to notify the application servers transmitting the one or more data feeds that subsequent data feeds are to be transmitted to the determined one of the plurality of edge nodes.

5. The system of claim 1, wherein the instructions configured to determine the rate of reject are further configured to determine the rate of rejection by implementing a machine learning model that correlates a volume of records in a data feed to a volume of rejected records in the data feed.

6. The system of claim 1, wherein the instructions are further configured to: in response to determining that rate of reject does not exceed the predetermined reject rate threshold:
   implement one or more machine learning models to predict a growth, over a predetermined time period, of the rate of reject, and
   determine whether each data feed requires preprocessing at (i) the target, or (ii) upstream of the target based on the growth of the rate or reject over the predetermined period of time.

7. A computer-implemented method for determining which edge node to use for data feed preprocessing, the method executable by one or more processing devices and comprising;
   analyzing the data feeds prior to transmission from the plurality of application servers to determine whether each data feed requires preprocessing at (i) the target, or (ii) upstream of the target by determining a rate of reject for each data feed transmitted from one of the plurality application servers, comparing the rate of reject to a predetermined reject rate threshold, and determining that the data feed requires preprocessing (ii) upstream of the target based on the rate of reject exceeding the predetermined reject rate threshold;
   determining an Internet Protocol (IP) address for each of a plurality of edge nodes and each of a plurality of the application servers transmitting one or more data feeds;

continuously pinging the application servers transmitting the one or more data feeds from each of the plurality of edge nodes to determine response time for each of applications server and edge node pair from amongst the applications servers and the plurality of edge nodes;

training a plurality of machine-learning models, each machine-learning model associated with (i) one of the application servers transmitting the one or more data feeds and (ii) one of the plurality of edge nodes, wherein the machine learning models are trained using the determined response times and network bandwidth usage of the networks used for communication between the application servers transmitting the one or more data feeds and the plurality of edge nodes; and executing the plurality of machine-learning models to determine which of the machine-learning models outputs a lowest response time, wherein the one of the edge nodes associated with the machine-learning model with the lowest response time defines the edge node to preprocess the data feed transmitted from the corresponding application server; and generating preprocessing logic for the one or more of the data feeds and transmit the preprocessing logic to the corresponding determined one of the plurality of edge nodes.

8. The computer-implemented method of claim 7, further comprising:

receiving, at the one of the plurality of edge nodes, the preprocessing logic; and executing the preprocessing logic on data feeds received from one or more of the application servers using dynamic preprocessing rules prior to transmitting the preprocessed data feeds to the target.

9. The computer-implemented method of claim 7, wherein preprocessing of the data feeds comprises filtering the data feed to remove data that is deemed to be irrelevant to an analytical use case performed at the target.

10. The computer-implemented method of claim 7, further comprising:

notifying the application servers transmitting the one or more data feeds that subsequent data feeds are to be transmitted to the determined one of the plurality of edge nodes.

11. A computer program product including a non-transitory computer-readable medium, the non-transitory computer-readable medium comprising:

a first set of codes for causing a computer to analyze the data feeds prior to transmission from the plurality of application servers to determine whether each data feed requires preprocessing at (i) the target, or (ii) upstream of the target by determining a rate of reject for each data feed transmitted from one of the plurality application servers, comparing the rate of reject to a predetermined reject rate threshold, and determining that the data feed requires preprocessing (ii) upstream of the target based on the rate of reject exceeding the predetermined reject rate threshold;

a second set of codes for causing a computer to determine an Internet Protocol (IP) address for each of a plurality of edge nodes and each of a plurality of the application servers transmitting one or more data feeds;

a third set of codes for causing a computer to continuously ping the application servers transmitting the one or more data feeds from each of the plurality of edge nodes to determine response time for each of applications server and edge node pair from amongst the applications servers and the plurality of edge nodes;

a fourth set of codes for causing a computer to train a plurality of machine-learning models, each machine-learning model associated with (i) one of the application servers transmitting the one or more data feeds, and (ii) one of the plurality of edge nodes, wherein the machine learning models are trained using the determined response times and network bandwidth usage of the networks used for communication between the application servers transmitting the one or more data feeds and the plurality of edge nodes;

a fifth set of codes for causing a computer to execute the plurality of machine-learning models to determine which of the machine-learning models outputs a lowest response time, wherein the one of the edge nodes associated with the machine-learning model with the lowest response time defines the edge node to preprocess the data feed transmitted from the corresponding application server; and a sixth set of codes for causing a computer to generate preprocessing logic for the one or more of the data feeds and transmit the preprocessing logic to the corresponding determined one of the plurality of edge nodes.

12. The computer program product of claim 11, wherein the non-transitory computer-readable medium further comprises:

a seventh set of codes for causing a computer to receive, at the one of the plurality of edge nodes, the preprocessing logic, and execute the preprocessing logic on data feeds received from one or more of the application servers using dynamic preprocessing rules prior to transmitting the preprocessed data feeds to the target.

13. The computer program product of claim 11, wherein preprocessing of the data feeds comprises filtering the data feed to remove data that is deemed to be irrelevant to an analytical use case performed at the target.

14. The computer program product of claim 11, wherein the non-transitory computer-readable medium further comprises:

a seventh set of codes for causing a computer to notify the application servers transmitting the one or more data feeds that subsequent data feeds are to be transmitted to the determined one of the plurality of edge nodes.

* * * * *